US012629625B2

(12) United States Patent
Wagenhauser et al.

(10) Patent No.: US 12,629,625 B2
(45) Date of Patent: *May 19, 2026

(54) COMPRESSOR SYSTEM AND FILTER HOUSING

(71) Applicant: Ingersoll-Rand Industrial U.S., Inc., Davidson, NC (US)

(72) Inventors: Matthew Charles Wagenhauser, Davidson, NC (US); Subodh Kumar, Huntersville, NC (US); Christopher Leamon, Concord, NC (US); James David Gillon, Kannapolis, NC (US)

(73) Assignee: Ingersoll-Rand Industrial U.S., Inc., Davidson, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/654,408

(22) Filed: May 3, 2024

(65) Prior Publication Data

US 2024/0286070 A1 Aug. 29, 2024

Related U.S. Application Data

(63) Continuation of application No. 17/991,929, filed on Nov. 22, 2022, now Pat. No. 11,992,799, which is a
(Continued)

(51) Int. Cl.
 *B01D 46/42* (2006.01)
 *B01D 46/00* (2022.01)
 (Continued)

(52) U.S. Cl.
 CPC ..... *B01D 46/4227* (2013.01); *B01D 46/0005* (2013.01); *B01D 46/24* (2013.01);
 (Continued)

(58) Field of Classification Search
 CPC ..... F04B 39/16; B01D 46/4227; B01D 46/88; B01D 46/0005; B01D 46/0004;
 (Continued)

(56) References Cited

U.S. PATENT DOCUMENTS

| 2,068,048 | A | * | 1/1937 | Renard | ............... B01D 46/003 |
| | | | | | 55/318 |
| 2,145,683 | A | * | 1/1939 | Bostock | ................ B01D 46/00 |
| | | | | | 222/189.09 |

(Continued)

FOREIGN PATENT DOCUMENTS

| CN | 201179395 | 1/2009 |
| CN | 203315906 | 12/2013 |

(Continued)

OTHER PUBLICATIONS

Extended European Search Report, European Patent Application No. 19170351.1, Sep. 2, 2019, 6 pages.
(Continued)

*Primary Examiner* — Duane Smith
(74) *Attorney, Agent, or Firm* — Kevin E. West; Advent, LLP

(57) ABSTRACT

A compressor system includes a compression module having an inlet for receiving air; and a filter housing in fluid communication with the compression module. The filter housing is constructed to house a filter, the filter having a sealing feature disposed at a first end of the filter and having an engagement feature disposed at a second end of the filter opposite the first end. The filter housing includes a trap door constructed to contact the engagement feature, and constructed to drive the engagement feature in a direction parallel to an axis of the filter toward the sealing feature and urge the sealing feature into sealing engagement with the filter housing.

19 Claims, 6 Drawing Sheets

Related U.S. Application Data continuation of application No. 17/195,955, filed on Mar. 9, 2021, now Pat. No. 11,504,666, which is a continuation of application No. 15/957,460, filed on Apr. 19, 2018, now Pat. No. 10,940,423.

(51) Int. Cl.
B01D 46/24 (2006.01)
B01D 46/88 (2022.01)

(52) U.S. Cl.
CPC ........ B01D 46/88 (2022.01); *B01D 2265/028* (2013.01); *B01D 2271/022* (2013.01); *B01D 2273/14* (2013.01)

(58) Field of Classification Search
CPC .. B01D 46/0002; B01D 46/001; B01D 46/24; F04C 29/0092
USPC ...... 55/316, 318, 385.2, 387, 422, 473, 502, 55/505–507, 509, 521, DIG. 33, 493, 494, 55/508, 498, 467, 480, 481; 415/121.2
See application file for complete search history.

(56) References Cited

U.S. PATENT DOCUMENTS

| | | | | |
|---|---|---|---|---|
| 2,189,704 | A * | 2/1940 | Campbell | F04B 39/16 210/493.1 |
| 2,509,505 | A * | 5/1950 | Johnson | F04B 39/16 251/118 |
| 2,962,121 | A * | 11/1960 | Wilber | B01D 46/521 55/497 |
| 3,064,818 | A * | 11/1962 | Kasten | B01D 17/10 210/324 |
| 3,201,927 | A * | 8/1965 | Wachter | B01D 46/0005 55/504 |
| 3,423,909 | A * | 1/1969 | Bennett | B01D 46/10 55/498 |
| 3,672,130 | A * | 6/1972 | Sullivan | F02M 35/022 55/330 |
| 3,736,074 | A * | 5/1973 | Kilbane | F04B 39/0033 415/58.4 |
| 3,876,401 | A * | 4/1975 | Sturgill | F04B 39/16 55/481 |
| 4,010,016 | A * | 3/1977 | Haugen | F04D 25/163 55/473 |
| 4,015,959 | A * | 4/1977 | Grote | B01D 53/26 55/494 |
| 4,174,204 | A * | 11/1979 | Chase | B01D 46/71 55/472 |
| 4,177,049 | A * | 12/1979 | Haslett, Jr. | B01D 53/261 55/501 |
| 4,204,848 | A * | 5/1980 | Schulmeister | F02M 35/02 55/315 |
| 4,214,882 | A * | 7/1980 | Brenholt | B01D 46/48 55/472 |
| 4,290,792 | A * | 9/1981 | Eckstein | B65D 45/32 55/504 |
| 4,312,651 | A * | 1/1982 | Esaki | B01D 46/2411 55/502 |
| 4,395,269 | A | 7/1983 | Schuler | |
| 4,482,368 | A * | 11/1984 | Roberts | F16B 33/004 411/303 |
| 4,498,914 | A * | 2/1985 | Ericksen | B01D 46/2411 55/504 |
| 4,632,681 | A * | 12/1986 | Brunner | B01D 46/71 55/508 |
| 4,632,682 | A * | 12/1986 | Erdmannsdorfer | B01D 46/2414 55/504 |
| 4,657,487 | A * | 4/1987 | Schonwald | F04C 23/00 55/482 |
| 4,690,759 | A * | 9/1987 | Mandy | B01D 45/14 55/471 |
| 4,707,166 | A * | 11/1987 | Khosropour | B60T 17/004 55/467 |
| 4,761,166 | A * | 8/1988 | Kitchener | F04C 29/026 55/467 |
| 4,775,398 | A * | 10/1988 | Howeth | B01D 46/71 55/498 |
| 4,871,380 | A * | 10/1989 | Meyers | B01D 46/2411 55/498 |
| 4,961,764 | A | 10/1990 | Develle et al. | |
| 5,190,321 | A * | 3/1993 | Krantz | B01D 46/2411 285/39 |
| 5,746,796 | A * | 5/1998 | Ambs | B01D 46/2411 55/480 |
| 5,776,211 | A * | 7/1998 | Jacob | B01D 46/0004 55/480 |
| 5,803,715 | A * | 9/1998 | Kitchener | F04B 39/16 417/313 |
| 5,803,954 | A * | 9/1998 | Gunter | B01D 46/48 55/498 |
| 6,214,077 | B1 * | 4/2001 | Bitner | B01D 46/0005 55/498 |
| 6,444,005 | B1 * | 9/2002 | Bitner | B01D 46/88 55/482 |
| 6,676,721 | B1 * | 1/2004 | Gillingham | B01D 46/0086 55/497 |
| 6,716,264 | B2 * | 4/2004 | Onoda | B01D 46/88 55/504 |
| 6,991,443 | B2 * | 1/2006 | Aoki | F04C 29/026 55/400 |
| 7,318,851 | B2 | 1/2008 | Brown et al. | |
| 7,404,839 | B2 * | 7/2008 | Modesto | B01D 46/0004 55/480 |
| 7,520,925 | B2 * | 4/2009 | Sisk | B01D 46/0004 96/380 |
| 7,972,401 | B2 * | 7/2011 | Stock | F02C 7/052 55/482 |
| 8,734,554 | B2 * | 5/2014 | Harper | F16J 15/061 55/498 |
| 8,808,432 | B2 | 8/2014 | Rotter et al. | |
| 10,940,423 | B2 * | 3/2021 | Wagenhauser | F04B 39/16 |
| 11,504,666 | B2 * | 11/2022 | Wagenhauser | B01D 46/0005 |
| 11,992,799 | B2 * | 5/2024 | Wagenhauser | B01D 46/4227 |
| 2002/0104296 | A1 * | 8/2002 | Cook | F04C 23/00 55/467 |
| 2006/0032197 | A1 | 2/2006 | Pyron | |
| 2006/0091064 | A1 | 5/2006 | Brown et al. | |
| 2009/0324430 | A1 | 12/2009 | Pyke et al. | |
| 2010/0263344 | A1 * | 10/2010 | Haynam | B01D 46/2414 55/502 |
| 2012/0006731 | A1 | 1/2012 | Swift, Jr. | |
| 2014/0260144 | A1 * | 9/2014 | Williams | B01D 46/2414 55/502 |
| 2016/0096134 | A1 * | 4/2016 | Santini | B01D 46/645 55/487 |
| 2017/0050135 | A1 | 2/2017 | Aota et al. | |
| 2017/0056801 | A1 | 3/2017 | Gandhi | |
| 2017/0340997 | A1 * | 11/2017 | Otsuka | B01D 46/0031 |
| 2018/0243676 | A1 * | 8/2018 | Bartelt | B01D 46/2411 |
| 2019/0118130 | A1 * | 4/2019 | Blue | B01D 46/0004 |
| 2019/0321767 | A1 * | 10/2019 | Wagenhauser | B01D 46/4227 |
| 2025/0214021 | A1 * | 7/2025 | Neef | B01D 46/0002 |

FOREIGN PATENT DOCUMENTS

| | | |
|---|---|---|
| DE | 102016002246 | 8/2017 |
| KR | 101179791 | 9/2012 |

OTHER PUBLICATIONS

Office Action for Chinese Application No. 201910312729.5, dated Dec. 1, 2021.

* cited by examiner

COMPRESSOR SYSTEM AND FILTER HOUSING

CROSS-REFERENCE TO RELATED APPLICATIONS

The present application is a continuation of U.S. patent application Ser. No. 17/991,929, filed Nov. 22, 2022, now U.S. Pat. No. 11,992,799, and titled "COMPRESSOR SYSTEM AND FILTER HOUSING", which is a continuation of U.S. patent application Ser. No. 17/195,955, filed Mar. 9, 2021 and titled "COMPRESSOR SYSTEM AND FILTER HOUSING", now U.S. Pat. No. 11,504,666, which is a continuation of U.S. patent application Ser. No. 15/957,460, filed Apr. 19, 2018 and titled "COMPRESSOR SYSTEM AND FILTER HOUSING", now U.S. Pat. No. 10,940,423. U.S. patent application Ser. No. 17/991,929, U.S. Pat. Nos. 11,504,666, and 10,940,423 are herein incorporated by reference in their entireties.

TECHNICAL FIELD

The present application relates generally to compressors and more particularly, but not exclusively, to compressor systems and filter housings for compressor systems.

BACKGROUND

Compressor systems remain an area of interest. Some existing systems have various shortcomings, drawbacks and disadvantages relative to certain applications. For example, in some compressor system configurations, the replacement of air filters may present more ergonomic risk to the person replacing the filters than desired. Accordingly, there remains a need for further contributions in this area of technology.

SUMMARY

One embodiment of the present invention is a unique compressor system. Another embodiment is a unique filter housing. Another embodiment is a unique method for performing maintenance on a compressor system. Other embodiments include apparatuses, systems, devices, hardware, methods, and combinations for compressor systems and filter housings for the compressor systems. Further embodiments, forms, features, aspects, benefits, and advantages of the present application shall become apparent from the description and figures provided herewith.

BRIEF DESCRIPTION OF THE FIGURES

The description herein makes reference to the accompanying drawings wherein like reference numerals refer to like parts throughout the several views, and wherein.

DETAILED DESCRIPTION OF THE ILLUSTRATIVE EMBODIMENTS

Figure 1:
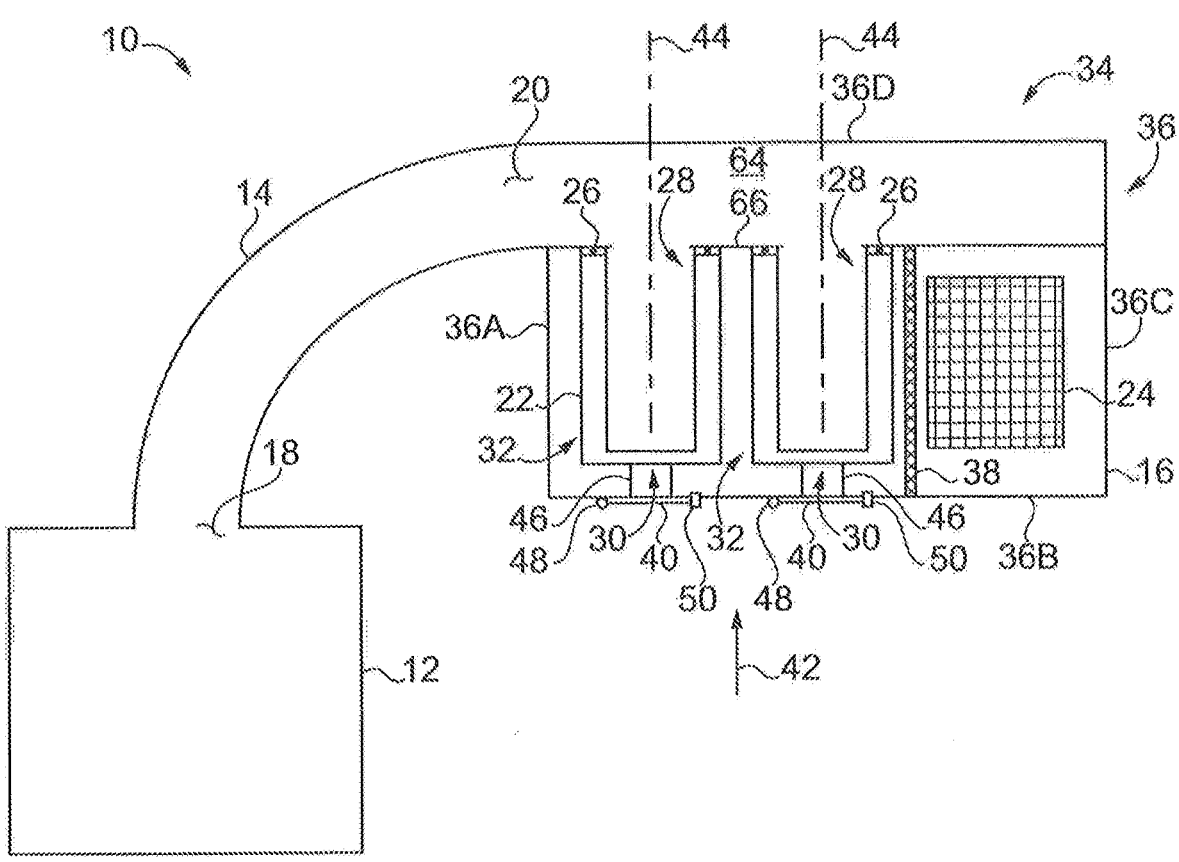
FIG. 1 schematically illustrates some aspects of a non-limiting example of a compressor system in accordance with an embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Referring to FIG. 1, some aspects of a non-limiting example of a compressor system 10 in accordance with an embodiment of the present invention are schematically illustrated. Compressor system 10 includes a compression module 12, an inlet duct 14 and a filter housing 16. Filter housing 16 is in fluid communication with compression module 12. Compression module 12 includes one or more compressors, e.g., one or rotary screw compressors and/or other compressor types arranged in series and/or parallel. In one form, compression module is a machine in the range of 90-500 kW. In other embodiments, compressor module 12 may be larger or smaller. Compression module 12 includes a compression module inlet 18 for receiving filtered air from filter housing 16. Filter housing 16 includes a filter housing outlet 20 for providing filtered air to compression module 12. Inlet duct 14 is fluidly couples compression module inlet 18 and filter housing outlet 20 for delivering filtered air from filter housing 16 to compression module 12.

Filter housing 16 is constructed to house one or more filter elements or filters 22. The number of filter elements or filters 22 may vary with the needs of the application. Filter housing 16 has a filter housing inlet 24 for receiving air into filter housing 16 for filtering by filters 22 prior to delivery of the air to compression module 12, e.g., particulate filtration. Each filter 22 has a sealing feature 26 disposed at a top end 28 of the filter 22. Each filter 22 has an engagement feature 30 disposed at a bottom end 32 of the filter 22 opposite top end 28. Filter housing 16 includes an enclosure 34 having a plurality of walls 36 constructed to house filters 22, e.g., some of which are illustrated as walls 36A, 36B, 36C and 36D in FIG. 1. In some embodiments, a pre-separator assembly 38, e.g., a mechanical pre-separator system, may be employed upstream of the filters 22. Pre-separator assembly 38 is constructed to maintain the operating life of filters 22 in high-dust or heavy-duty ambient environments, e.g., environments having a higher degree of particulate contamination than a typical environment in which compressor systems such as compressor systems 10 are operated.

Filter housing 16 includes a trap door 40 disposed on an external wall of filter housing 16, e.g., wall 36B adjacent to and facing opposite to the bottom end 32 of filters 22. In one form, trap door 40 opens filter housing 16 to the environment surrounding filter housing 16. In other embodiments, trap door 40 may be disposed on any internal or external wall of filter housing 16, and may or may not open to the environment surrounding filter housing 16.

Trapdoor 40 is constructed to contact engagement feature 30, and constructed to, e.g., when closed or when being closed, drive engagement feature 30 in a direction 42 parallel or substantially parallel to an axis 44 of an installed filter 22 toward sealing feature 26, and urge sealing feature 26 into sealing engagement with filter housing 16. In one form, trap door 40 includes an extension in the form of a collar 46 that is constructed to interface with engagement feature 30. Trap door 40 is secured to wall 36B with a hinge 48. Hinge 48 is constructed to provide leverage to move filter 22 upward and into a seated position, in which sealing feature 26 is compressed against and/or pressed into filter housing 16. A latch 50 is used to secure trap door 40 in the closed position. The latch 50 may be unlatched or disengaged in order to open trap door 40.

Figure 2:
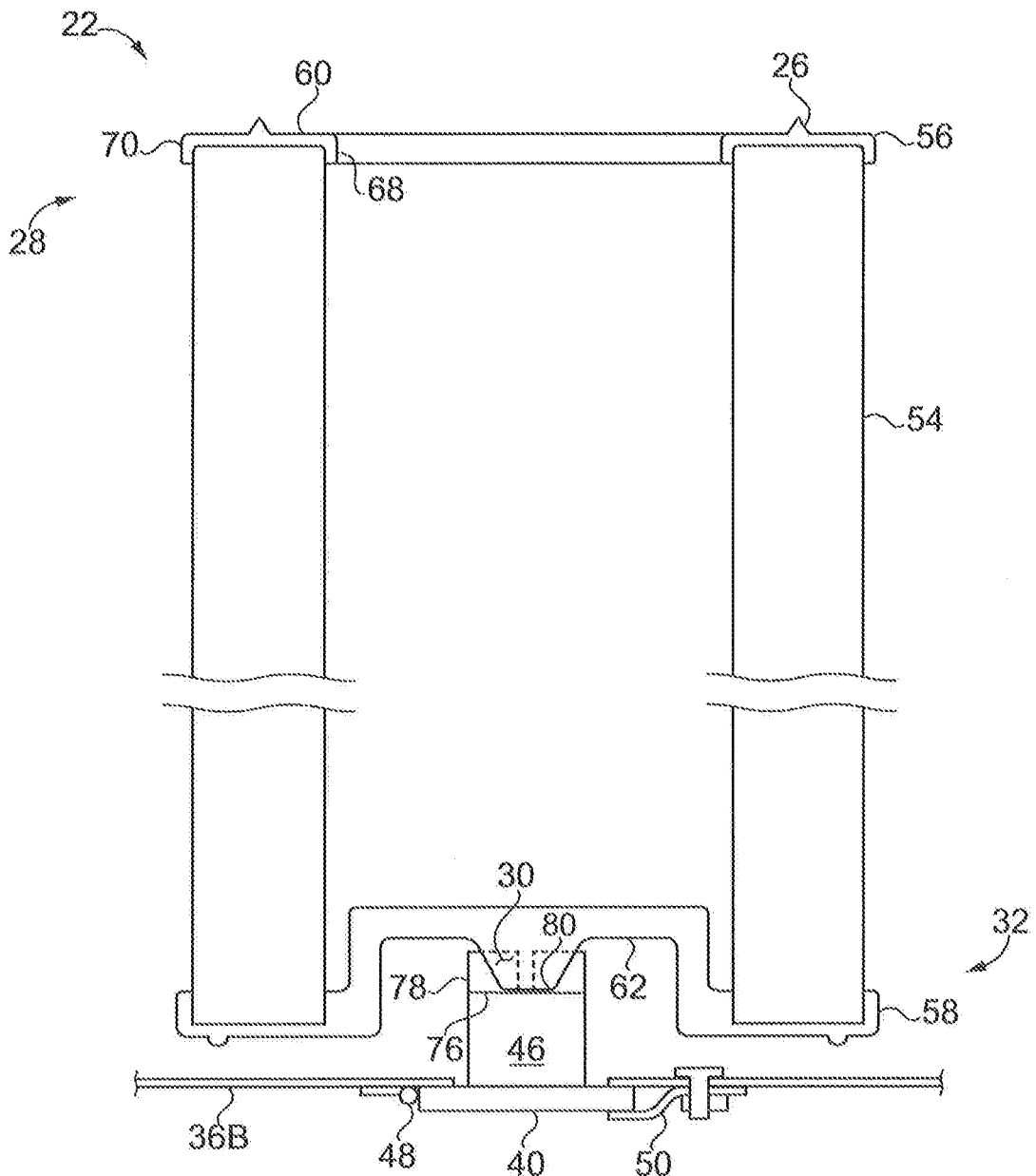
FIG. 2 schematically illustrates some aspects of a non-limiting example of a filter and a filter housing in accordance with an embodiment of the present invention.

Referring also to FIG. 2, some aspects of a non-limiting example of filter 22 are illustrated in a cross-sectional view in accordance with an embodiment of the present invention. In one form, filter 22 is cylindrical. In other embodiments, filter 22 may have different geometries. Filter 22 includes a filler mesh 54, a top end cap 56 disposed at top end 28, and a bottom end cap 58 disposed at bottom end 32 of filter 22. Filter mesh 54 is sandwiched between and sealed between top end cap 56 and bottom end cap 58. During operation, air enters filter mesh 54, and is filtered as it passes through filter mesh 54 into the interior of filter 22. Top end cap 56 is open to allow filtered air to exit filter 22 into plenum 64 (FIG. 1), from whence the filtered air flows into and through filter housing outlet 20 and then through inlet duct 14 into compression module 12. Bottom end cap 58 is closed, which prevents the flow of air therethrough.

In the illustrated embodiment, sealing feature 26 is a face seal, e.g., a compressible face seal. In other embodiments, other types of seals, e.g., compressible seals, may be employed. For example, sealing feature 26 may be or include cylindrical seals or sealing features or seal bands, e.g., disposed on top end cap 56 such as on the inner and/or outer periphery (internal perimeter and/or external perimeter) of top end cap 56, or may be other seal configurations, e.g., other than a force or cylindrical seals. Top end 28 includes, e.g., as part of top end cap 56, a top end face 60. Sealing feature 26 in the form of a face seal may be, for example, a deformable sealing ring protruding from and integral with the top end face 60. Bottom end 32 of filter 22 includes, as part of bottom end cap 58, a bottom end face 62. Bottom end face 62 is recessed into or within bottom end 32 of filter 22. Engagement feature 30 protrudes outward from bottom end face 62. In one form, engagement feature 30 is a frustum of a cone. In other embodiments, engagement feature 30 may take other geometric forms.

Filter 22 at top end cap 56 includes an internal perimeter 68, i.e., an internal bounding dimensional feature of top end cap 56, which is an internal boundary of an internal interface of filter 22 with filter housing 16. In one form, internal perimeter 68 is an internal diameter of a circular or cylindrical top end cap 56 for the depicted cylindrical filter 22. In other embodiments, internal perimeter 68 may be another geometrical shape, e.g., conforming to the shape of filter 22. Filter 22 at top end cap 56 also includes an external perimeter 70, i.e., an external bounding dimensional feature of top end cap 56, which is an external boundary of an external interface of filter 22 with filter housing 16. In one form, external perimeter 70 is an outside diameter of a circular or cylindrical top end cap 56 for the depicted cylindrical filter 22. In other embodiments, external perimeter 70 may be another geometrical shape, e.g., conforming to the geometric shape of filter 22. In one form, the external perimeter 70 or outside diameter of top end cap 56 is concentric with the internal diameter or internal perimeter 68 of top end cap 56. In some embodiments, internal perimeter 68 and external perimeter 70 may form sealing surfaces, e.g., compressible sealing surfaces, on top end cap 56 or a similar feature of filter 22 for sealing filter 22 against filter housing 16, e.g., against walls 72 and 74, respectively, described below.

Trap door 40 includes an extension in the form of a collar 46 extending therefrom. In one form, collar 46 of trap door 40 is a cylindrical extension. In other embodiments, the extension may have other geometrical shapes. Disposed within collar 46 is a driving surface 76. Driving surface 76 is recessed within collar 46. Driving surface 76 may be, for example, welded in place. An upper portion 78 of collar 46 may be slotted, e.g., for ease of access to weld driving surface 76 in place. Engagement feature 30 of filter 22 has an engagement surface 80. In some embodiments, engagement surface 80 is spaced apart from bottom end face 62 of filter 22. Driving surface 76 is constructed to apply a force against engagement surface 80 and drive filter 22 into a seated position by closing trap door 40. Trap door 40 is constructed to lever filter 22 against filter housing 16 and compress sealing feature 26 against an upper wall 66 of filter housing 16 and/or press filter 22 into filter housing 16, e.g., between walls 72, 74 (described below with respect to FIG. 3) of filter housing 16, e.g., depending upon the type of sealing feature 26. Hinge 48 is constructed to provide leverage to compress sealing feature 26 against upper wall 66 and/or press sealing feature 26 between walls 72, 74 of filter housing 16.

When trap door 40 is being closed, driving surface 76 contacts and engages engagement surface 80, and drives filter 22 against filter housing 16, compressing sealing feature 26 against filter housing 16, thus sealing the top end 28 of filter 22 against filter housing 16, e.g., against wall 66 and/or wall 72 and/or wall 74. Collar 46 encompasses and surrounds the protruding engagement feature 30 of filter 22 when trap door 40 is closed, e.g., is in the closed position. When filter 22 is in the seated position, sealing feature 26 is compressed against an upper portion of filter housing 16, e.g., a face seal against a flat surface, or a cylindrical or seal having other geometry against a cylindrical surface or a surface having other geometry, depending upon the embodiment.

Figure 3:
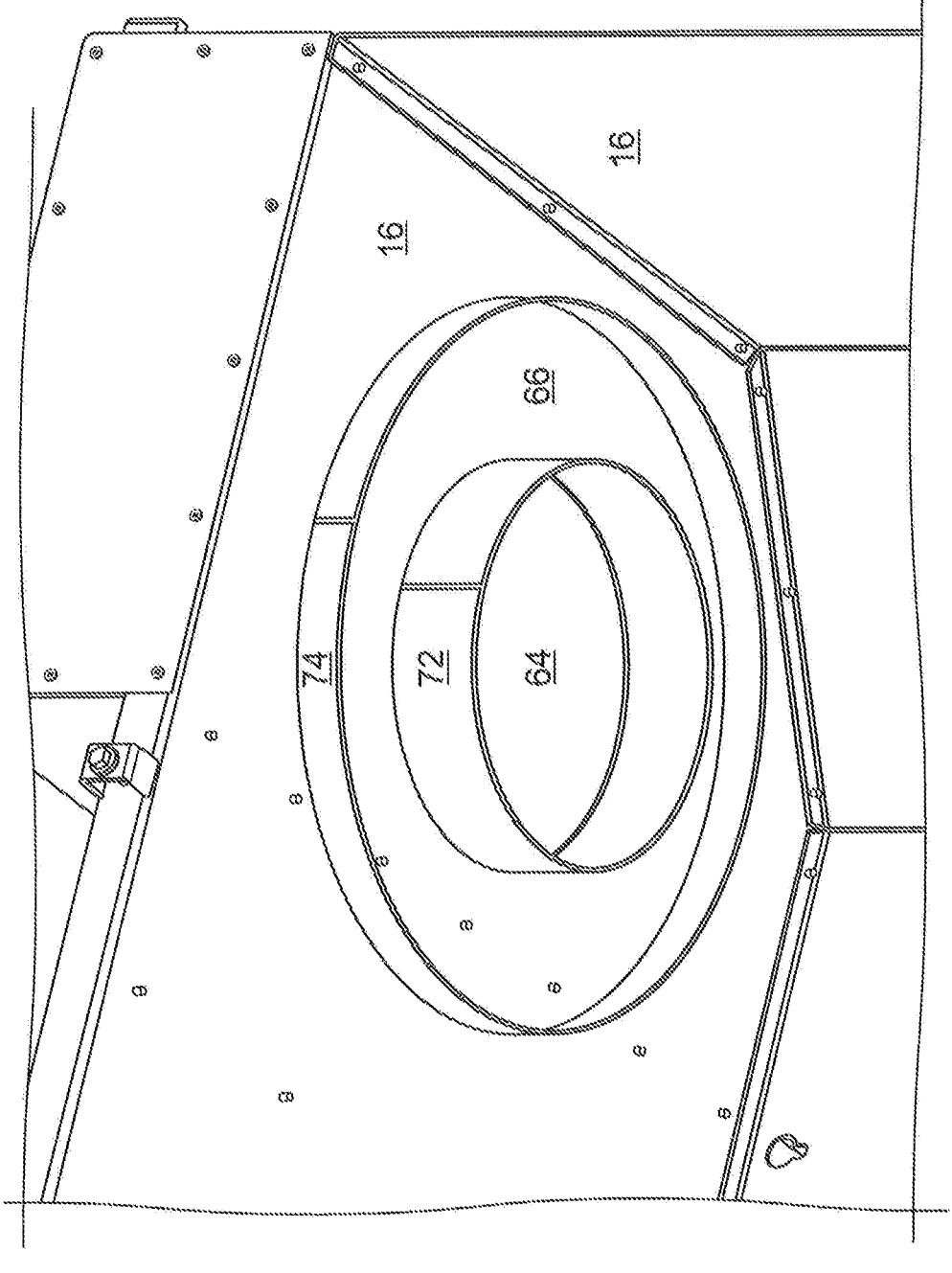
FIG. 3 schematically illustrates some aspects of a non-limiting example of a filter housing in accordance with an embodiment of the present invention.

Referring also to FIG. 3, some aspects of a non-limiting example of a filter housing are illustrated in accordance with an embodiment of the present invention. As illustrated in FIG. 3, the upper portion or top of filter housing 16, e.g., below plenum 64, has respective inner and outer walls 72 and 74 constructed to capture, secure and locate, and in some embodiments, seal against, the top end 28 of filter 22. Walls 72 and 74 extend from upper wall 66 of filter housing 16, which, for example, may also serve as a wall for plenum 64 in some embodiments, or may be adjacent to plenum 64 in some embodiments. Walls 72 and 74 are constructed to receive the internal and external perimeters 68, 70, respectively, of filter 22, securing the top end 28 of filter 22 in place with housing 16. Inner wall 72 is constructed to fit inside of and engage internal perimeter 68, and to position and pilot inner perimeter 68. Inner wall 72 is constructed to be received into internal perimeter 68. In some embodiments, internal perimeter 68 may be constructed as a seal collar, e.g., a polymeric seal, and may be compressed and seal against inner wall 72. In some embodiments, inner wall 72 is also constructed to provide structural support to inner top end cap 56 along inner perimeter 68. Outer wall 74 is constructed to fit over and engage top end cap 56 with external perimeter 70 and to position and pilot external perimeter 70. Outer wall 74 is constructed to receive the outside of external perimeter 70. In some embodiments, external perimeter 70 may be constructed as a seal collar, e.g., a polymeric seal, and may be compressed and seal against outer wall 74. In some embodiments, outer wall 74 is also constructed to provide structural support to top end cap 56 along external perimeter 70. In one form, inner wall 72 is a ring collar, i.e., a ring-shaped collar, and outer wall 74 is a ring collar concentric with inner wall 72.

Figure 4:
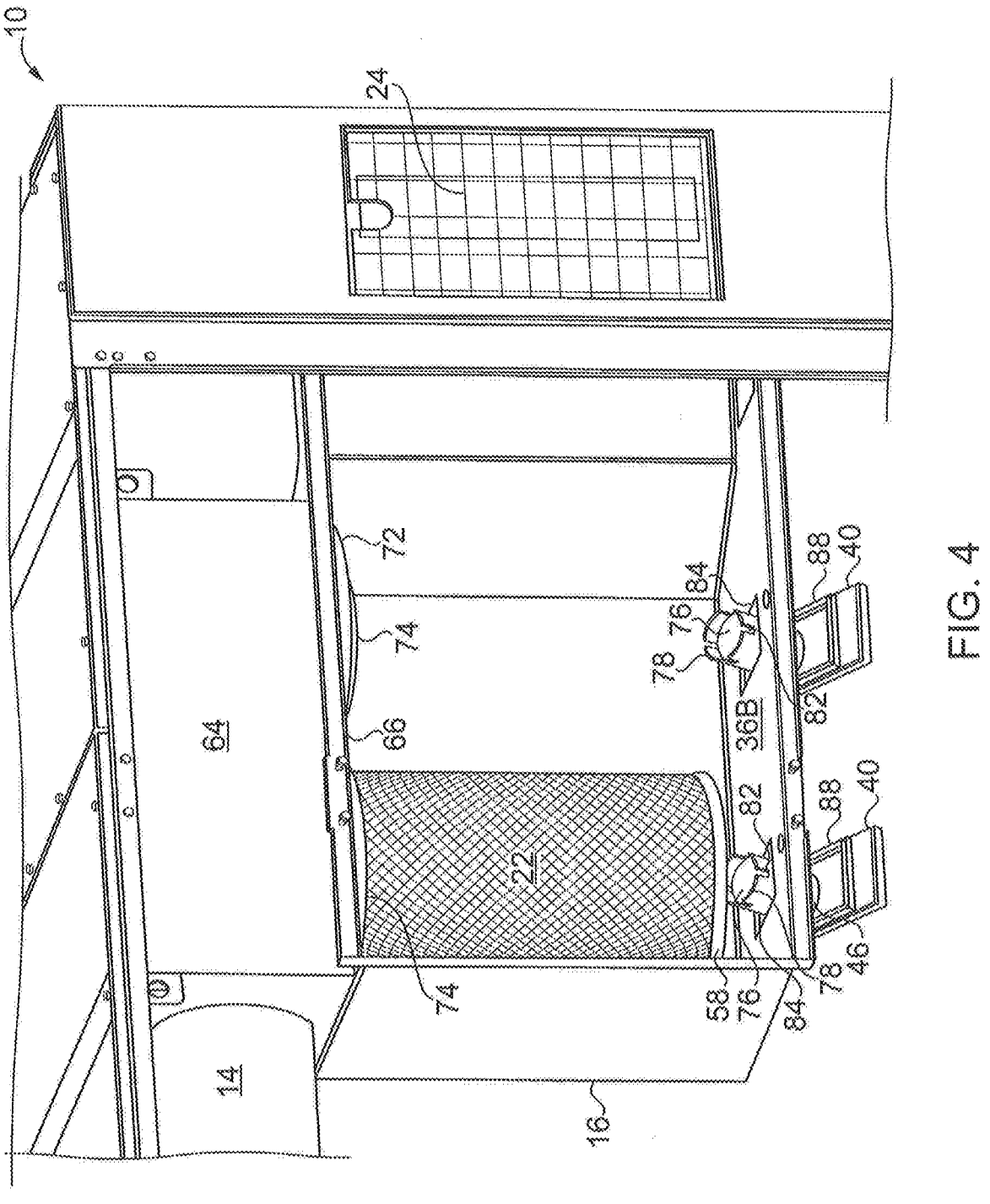
FIG. 4 illustrates some aspects of a non-limiting example of a compressor system in accordance with an embodiment of the present invention.

Referring also to FIG. 4, some aspects of a non-limiting example of compressor system 10 are illustrated in accordance with an embodiment of the present invention. Filter housing 16 is depicted with a front panel removed to illustrate internal features. Only a single filter 22 is shown. FIG. 4 illustrates trap doors 40 in a partially closed position. Slots 82 in upper portion 78 of collar 46 are visible. An opening 84 in bottom wall 36B of filter housing 16 permits collar 46 of trap door 40 entry into filter housing 16. In some embodiments, trap door 40 includes a seal 88 that seals against bottom wall 36B of filter housing 16.

Figure 5:
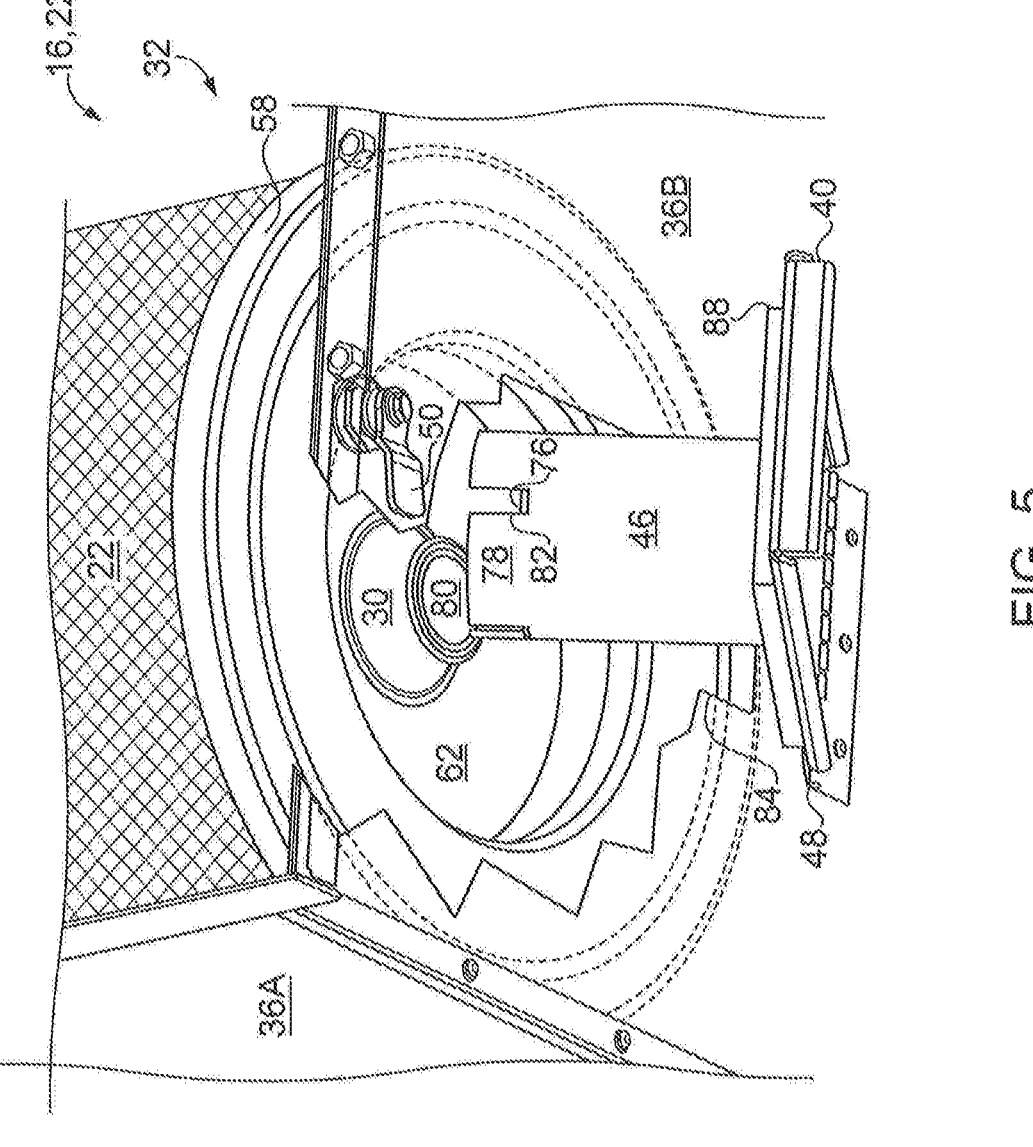
FIG. 5 illustrates a bottom perspective of some aspects of a filter housing in accordance with an embodiment of the present invention.

Referring also to FIG. 5, some aspects of a non-limiting example of filter housing 16 and filter 22 are illustrated in accordance with an embodiment of the present invention. Trap door 40 is in a partially closed position. The closing of trap door 40 rotates trap door 40 about hinge 48, bringing collar 46 into closer proximity to engagement feature 30. As trap door 40 closes completely, collar 46 encompasses engagement feature 30, surrounding engagement feature 30, and driving surface 76 engages engagement surface 80 of filter 22, driving filter 22 upward into the seated position, compressing sealing feature 26 to form a tight seal with mating hardware, e.g., upper wall 66 and/or with walls 72 and 74. In some embodiments, it may be desirable to tilt filter 22 while closing trap door 40, in order to line up engagement feature 30 with collar 46, and then push filter 22 into a vertical position and closing trap door 40 after upper portion 78 of collar 46 clears engagement feature 30.

Figure 6:
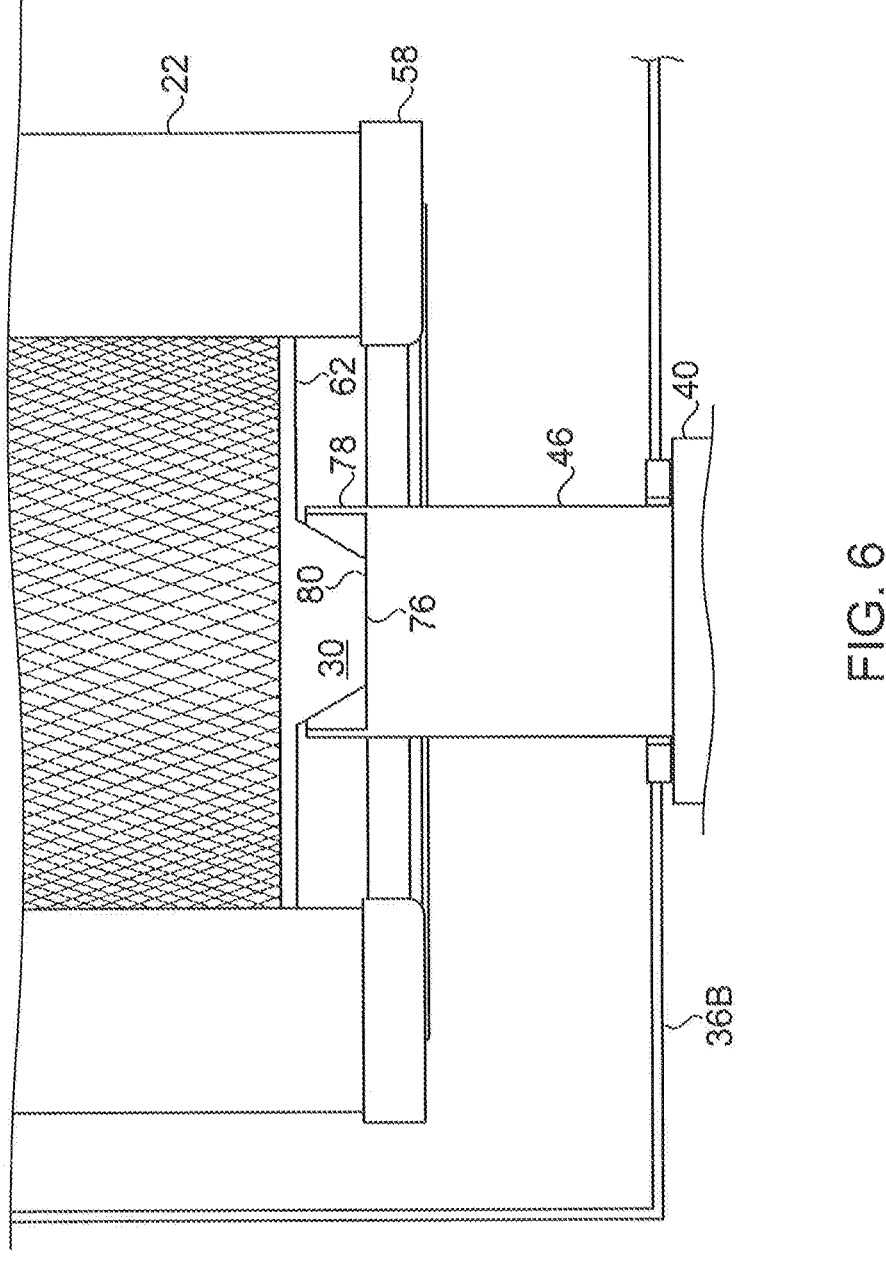
FIG. 6 illustrates a side partial cross-section view of some aspects of a filter and filter housing in accordance with an embodiment of the present invention.

Referring also to FIG. 6, some aspect of a non-limiting example of filter 22 and filter housing 16 are illustrated in accordance with an embodiment of the present invention in a partial cross-sectional view. Upper portion 78 of collar 46 of trap door 40 is seen encompassing and surrounding the protruding engagement feature 30 of filter 22, and driving surface 76 of trap door 40 is in engagement with engagement surface 80 of engagement feature 30, retaining filter 22 in the seated position.

In preparing compressor system 10 for use, and in performing maintenance on compressor system 10, filter 22 is inserted into filter housing 16. Trap door 40 is then closed, wherein the closing of trap door 40 drives filter 22 into a seated position and compresses sealing feature 26 against the filter housing and/or presses filter 22 into filter housing 16, e.g., between walls 72, 74, Trapdoor 40 may then be latched in a closed position using latch 50. The compressor system is now ready for operation. To replace the filter 22, trap door 40 may be opened, releasing filter 22 from the seated position, after which filter 22 may be removed. The replacement filter may then be inserted into filter housing 16, and then the trap door 40 closed and latched.

Embodiments of the present invention include compressor system, comprising: a compression module having an inlet for receiving air; and a filter housing in fluid communication with the compression module, wherein the filter housing is constructed to house a filter, the filter having a scaling feature disposed at a first end of the filter and having an engagement feature disposed at a second end of the filter opposite the first end, the filter housing having a trap door constructed to contact the engagement feature, and constructed to drive the engagement feature in a direction parallel to an axis of the filter toward the sealing feature and urge the sealing feature into sealing engagement with the filter housing.

In a refinement, the sealing feature is a face seal.

In another refinement, the first end includes a first end face, and wherein the face seal is a deformable sealing ring protruding from and integral with the first end face.

In yet another refinement, the second end includes a second end face; and wherein the engagement feature protrudes from the second end face.

In still another refinement, the second end face is recessed within the second end.

In yet still another refinement, the engagement feature is a frustum of a cone.

In a further refinement, the trap door includes a driving surface; wherein the engagement feature has an engagement surface spaced apart from the second end face; and wherein the driving surface is constructed to apply a force against the engagement surface and drive the filter into a seated position by closing the trap door.

In a yet further refinement, the driving surface is constructed to apply a force against the engagement surface and drive the filter against the filter housing and compress the sealing feature against the filter housing.

In a still further refinement, the trap door has a collar extending therefrom; wherein the driving surface is recessed within the collar; wherein the collar encompasses the protruding engagement feature when the trap door is closed; and wherein the sealing feature is compressed against the filter housing when the filter is in the seated position.

In a yet still further refinement, the trap door is constructed to lever the filter against the filter housing and compress the sealing feature against the filter housing and/or press the sealing feature into the filter housing.

In another further refinement, the trap door includes a hinge constructed to provide leverage to compress the sealing feature and/or press the sealing feature into the filter housing.

In yet another further refinement, the filter includes an internal perimeter and an external perimeter; and wherein the filter housing includes a first wall operative to fit inside of and engage the internal; and wherein the filter housing includes a second wall into which the external perimeter fits and which engages with the external perimeter.

In still another further refinement, the internal perimeter is an inside diameter; wherein the external perimeter is an outside diameter concentric with the inside diameter; wherein the first wall is a first ring collar; and wherein the second wall is a second ring collar concentric with the first ring collar.

Embodiments of the present invention include a filter housing constructed to house a filter for a compressor system, the filter having a sealing feature disposed at a first end of the filter and having an engagement feature disposed at a second end of the filter opposite the first end, comprising: an enclosure having a plurality of walls constructed to house the filter; and trap door disposed in one of the walls, the trap door being constructed to contact the engagement feature, to drive the engagement feature in a direction parallel an axis of the filter toward the seating feature and urge the scaling feature into sealing engagement with the filter housing.

In a refinement, the trap door is constructed to lever the filter against the filter housing and compress the sealing feature against the filter housing and/or press the sealing feature into the filter housing.

In another refinement, the trap door includes a hinge constructed to provide leverage to compress the sealing feature and/or press the sealing feature into the filter housing by closing the trap door.

In still another refinement, the engagement feature protrudes from the filter; wherein the trap door includes a collar extending therefrom constructed to encompass the engagement feature when closed; and wherein the collar includes a driving surface recessed therein and constructed to apply a force against the engagement feature and drive the filter into a seated position by closing the trap door.

Embodiments of the present invention include a method of performing maintenance on a compressor system having a filter housing constructed to house a filter, comprising: inserting the filter into the filter housing; closing a trap door, wherein the closing of the trap door drives the filter into a seated position and compresses a sealing feature against the filter housing.

In a refinement, the method further comprises latching the trap door in a closed position.

In another refinement, the method further comprises opening the trap door, wherein the opening of the trap door releases the filter from the seated position; and removing the filter from the filter housing.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A compressor system, comprising:
a compression module having at least one compressor, the at least one compressor having an air inlet;
a pre-separator assembly configured to separate particles from entering the compression module; and
a filter housing positioned downstream from the preseparator assembly, the filter housing including a filter housing outlet in fluid communication with the air inlet, the filter housing configured to receive a filter having top end and a bottom end, wherein the top end includes a sealing feature and the bottom end includes an engagement feature, the filter housing configured to contact the engagement feature and to drive the engagement feature toward the sealing feature and urge the sealing feature into sealing engagement with the filter housing.

2. The compressor system of claim 1, wherein the sealing feature comprises a face seal and, the top end includes a top end face, and wherein the face seal comprises a deformable sealing ring protruding from and integral with the top end face.

3. The compressor system of claim 2, wherein the bottom end includes a bottom end face recessed within the bottom end; and wherein the engagement feature protrudes from the bottom end face.

4. The compressor system of claim 1, wherein the filter housing includes a trap door disposed on an external wall adjacent to the bottom end of the filter.

5. The compressor system of claim 4, wherein the trap door includes a driving surface configured to apply a force against the engagement surface and drive the filter into a seated position by closing the trap door.

6. The compressor system of claim 5, wherein the driving surface is configured to compress the sealing feature against the filter housing and press the sealing feature into the filter housing.

7. The compressor system of claim 5, wherein the trap door includes a collar extension, the collar extension configured to interface with the engagement feature.

8. The compressor system of claim 7, wherein the driving surface is recessed within the collar extension.

9. The compressor system of claim 7, wherein the collar extension is configured to encompass and surround the engagement feature when the trap door is in a closed position.

10. The compressor system of claim 4, wherein the trap door includes a hinge configured to provide leverage to press the sealing filter into the filter housing.

11. The compressor system of claim 4, wherein the trap door includes a latch configured to secure the trap door in a closed position.

12. A filter housing for receiving an air filter in a compression system, the filter having a top end and a bottom end, the top end having a sealing feature and the bottom end having an engagement feature, the filter housing comprising:
an enclosure configured to receive the filter; and
a trap door disposed on an external wall, the external wall facing the bottom end of the filter,
wherein the enclosure is configured to contact the engagement feature, to drive the engagement feature toward the sealing feature, and urge the sealing feature into sealing engagement with the filter housing.

13. The filter housing of claim 12, wherein the trap door includes a driving surface configured to apply a force against the engagement surface and drive the filter into a seated position by closing the trap door.

14. The filter housing of claim 13, wherein the driving surface is configured to compress the sealing feature against the filter housing and press the sealing feature into the filter housing.

15. The filter housing of claim 13, wherein the trap door includes a collar extension, the collar extension configured to interface with the engagement feature.

16. The filter housing of claim 15, wherein the driving surface is recessed within the collar extension.

17. The filter housing of claim 15, wherein the collar extension is configured to encompass and surround the engagement feature when the trap door is in a closed position.

18. The filter housing of claim 12, wherein the trap door includes a hinge configured to provide leverage to press the sealing filter into the filter housing.

19. The filter housing of claim 12, wherein the trap door includes a latch configured to secure the trap door in a closed position.

* * * * *